United States Patent
Klein et al.

(10) Patent No.: US 10,183,678 B2
(45) Date of Patent: Jan. 22, 2019

(54) SYSTEM, DEVICE AND METHOD FOR FUNCTIONAL PLAUSIBILITY CHECKING OF SENSOR DATA

(71) Applicant: Conti Temic microelectronic GmbH, Nuremberg (DE)

(72) Inventors: Wladimir Klein, Lindau (DE); Urban Meis, Goeppingen (DE)

(73) Assignee: Coni Temic microelectronic GmbH, Nuremberg (DE)

( * ) Notice: Subject to any disclaimer, the term of this patent is extended or adjusted under 35 U.S.C. 154(b) by 136 days.

(21) Appl. No.: 14/883,768

(22) Filed: Oct. 15, 2015

(65) Prior Publication Data

US 2016/0110932 A1 Apr. 21, 2016

(30) Foreign Application Priority Data

Oct. 15, 2014 (DE) .......... 10 2014 220 925

(51) Int. Cl.
 *B60W 50/00* (2006.01)
(52) U.S. Cl.
 CPC .................. *B60W 50/00* (2013.01)
(58) Field of Classification Search
 CPC .................................................. B60W 50/00
 USPC ....................................................... 701/30.3
 See application file for complete search history.

(56) References Cited

U.S. PATENT DOCUMENTS

2010/0023205 A1* 1/2010 Schmitt .................. B60W 40/11
 701/29.2
2014/0005505 A1* 1/2014 Peyser ................. A61B 5/7221
 600/316

FOREIGN PATENT DOCUMENTS

| DE | 102010049215 | 7/2011 |
|----|-------------|--------|
| DE | 102013203216 | 8/2014 |
| GB | 2 513 953 | 11/2014 |
| WO | WO 2009/071345 | 6/2011 |

OTHER PUBLICATIONS

German Search Report for German Patent Application No. 10 2014 220 925.0, dated May 27, 2015, 8 pages, Muenchen, Germany, with English translation, 6 pages.

* cited by examiner

*Primary Examiner* — Jelani A Smith
*Assistant Examiner* — Kelly D Williams
(74) *Attorney, Agent, or Firm* — W. F. Fasse

(57) ABSTRACT

A device, a sensor arrangement, a system and a method are provided for checking the plausibility of sensor data. The plausibility of the results of processing of sensor data is checked with an independent module by an alternative verification method at each stage, and quality indicators are calculated for the reliability of the calculated data from this plausibility check, which can be taken into account during further processing.

21 Claims, 2 Drawing Sheets

SYSTEM, DEVICE AND METHOD FOR FUNCTIONAL PLAUSIBILITY CHECKING OF SENSOR DATA

PRIORITY CLAIM

This application is based on and claims the priority under 35 USC 119 of German Patent Application DE 10 2014 220 925.0, filed on Oct. 15, 2014, the entire disclosure of which is incorporated herein by reference.

FIELD OF THE INVENTION

The invention relates to a method and a device for carrying out a functional plausibility check of sensor data.

BACKGROUND INFORMATION

One of the fundamental problems of the safety-related functions of driver assistance systems is verifying the sensor data received from the various connected sensors. To this end, the sensors are frequently designed to be redundant, in order to be able to establish the plausibility of the sensor data.

The particular problem of e.g. a lane detection system in a vehicle is detecting when the calculation results of certain calculation steps can no longer be trusted due to unreliable sensor data. In such a case, the respective safety-related functionality is then disabled. In the case of a lane detection system the lane detection is disabled, in order to exclude the possibility of accidents caused by faulty lane detection. Traditionally, the sensors on safety-related systems such as lane detection systems are therefore designed to be redundant. A module constantly monitors the results and/or sensor data of two sensors. If these fail simultaneously and/or in extremely similar ways, the relevant system remains activated. If the results and/or sensor data fail at different times, the functionality of the lane detection is disabled. However, the redundant design requires high installation costs and is therefore technically complex.

A central control unit for a plurality of assistance systems provided in a motor vehicle is known from WO 2009/071345 A1, which, in order to also be able to make safety-related interventions in the driving dynamics, comprises a safety control unit which checks non-redundant sensor information of the individual assistance systems by means of analytical redundancies of different information contained by the central control unit, in order to be able to guarantee the plausibility of the sensor data.

SUMMARY OF THE INVENTION

In view of the above, objects of one or more embodiments of the present invention include providing a device, a sensor arrangement, a system, and a method for checking the plausibility of sensor data, and particularly the plausibility of sensor data provided by sensors of a vehicle. Further objects of one or more embodiments of the invention are to avoid the need of providing redundant or duplicative sensors, and particularly to carry out a reliable, trustworthy and robust plausibility checking of the sensor data without considering or requiring redundant sensor data from redundant sensors. Another object of one or more embodiments of the invention is thus to provide plausibility checking of sensor data with reduced technical complexity in comparison to the prior art. The invention further aims to avoid or overcome various disadvantages of the prior art, and to achieve additional advantages, as apparent from the present specification. The attainment of these objects is, however, not a required limitation of the embodiments of the invention as claimed herein.

One or more embodiments of the present invention provide a system for checking the plausibility of sensor data supplied by sensors of a vehicle, wherein the sensor data is processed by a processing module by means of a processing algorithm, and the plausibility of the processed sensor data is checked by a plausibility checking module, wherein quality indicators are calculated for the sensors supplying sensor data on the basis of the plausibility check results and a monitoring module.

The system for checking the plausibility of sensor data preferably comprises at least one first module for processing sensor data, having a first input, a first output and a second output, at least one second module for checking the plausibility of sensor data, having a second input and a third output, a third module for monitoring the plausibility check of sensor data, having a third input and a fourth output, wherein the sensor data is input into the first input of the first module for processing sensor data, the first module for processing sensor data processes the sensor data by means of an algorithm, and the processed sensor data is output at the first output of the first module for processing sensor data, wherein data for checking the plausibility is output at the second output of the first module for processing sensor data and input into the second input of the second module for checking the plausibility of sensor data, wherein the second module for checking the plausibility of sensor data checks the plausibility of the sensor data by means of an alternative method, and the plausibility check results are output at the third output of the second module for checking the plausibility of sensor data and input into the third input of the third module for monitoring the plausibility check, wherein the third module for monitoring the plausibility check weights the plausibility check results and calculates quality indicators from these, wherein the calculated quality indicators for the sensors underlying the sensor data are output at the fourth output of the third module for monitoring the plausibility check of sensor data.

The sensor data is preferably data from a camera sensor, i.e. pixel-based image data. The sensor data can also originate from radar, lidar or ultrasonic sensors. The camera sensor can capture visible light. The camera sensor can also be an infrared sensor.

The quality indicators are preferably functionally descriptive quality indicators.

An advantage of one or more embodiments of the system and method according to the invention is that sensors no longer have to be designed to be redundant or provided in duplicate, in order to be able to monitor their functionality. Rather, probabilities are calculated from the multitude of data received and/or sensor data from various available sensors, e.g. other types of sensors, by the plausibility check according to the invention, which make it possible to draw a conclusion about the reliability of the sensors supplying the sensor data. These probabilities are provided in the form of quality indicators. This advantageously reduces the technical complexity of the system. In addition, all of the systems accessing the sensor data can also advantageously access the quality data and/or quality indicators and incorporate these and/or take account of these in their data processing.

In a preferred embodiment, a plurality of modules for processing sensor data are connected in series and/or parallel with their associated modules for checking the plausibility of sensor data, wherein the processed sensor data of the preceding module in series is input into the sensor inputs of the following module in series. The modules thereby perform special algorithms for processing and/or checking the plausibility of the sensor data. The advantage of this embodiment is that a more complex algorithm is broken down into smaller calculation routines, and the plausibility of the results of a partial calculation is checked first, before the next partial algorithm further processes the calculation results. This advantageously leads to significantly more robust algorithms with a reduced susceptibility to errors.

In a further preferred embodiment, the data for checking the plausibility is identical to the processed sensor data. As a result, the modules become simpler and the algorithms used become more robust.

In a further embodiment, the plausibility check results are input as plausibility check result feedback data again into the corresponding module for processing the sensor data into a further input of the module. Feeding back the plausibility check result feedback data creates a feedback loop which the algorithm can use in order to improve the processing internally. For example, decisions or assumptions affected by the algorithm can be amended, in order to reach more accurate calculation results.

More robust algorithms can therefore be advantageously used, which can be easily adapted to changing environmental conditions.

In a further embodiment, all of the data of the first modules for processing sensor data input into the first inputs and all of the data output at their first outputs is verified by the second modules for checking the plausibility of sensor data with an alternative verification model, and the plausibility check results are output at the respective outputs of the second modules for checking the plausibility of sensor data and input into respective inputs of the third module for monitoring the plausibility check. The results of the first modules for processing sensor data can be independently verified with this measure. Various methods can be considered as alternative checking methods: the second module for checking the plausibility of the sensor data can use third-party, independent sources of information or it checks the plausibility of, and/or verifies, the sensor data with a historically based algorithm which saves the data from previous processing steps and compares this with the newly calculated data, examining it for implausible values.

The plausibility check is carried out periodically, e.g. every 60 ms, in one possible embodiment. This results in the sensor data being continuously calculated and monitored, guaranteeing that the calculations are carried out at sufficient speed and also guaranteeing a sufficiently low reaction speed.

In one possible embodiment, the alternative verification method for checking plausibility includes the use of a second source of information, in order to verify the plausibility of the sensor data. This can e.g. be a calculation result from a different independent control unit of the relevant vehicle, which calculates the same values as the system according to the invention. However, independent calculation results, which are calculated by means of a different kind of algorithm, can also be used.

In a further embodiment, the modules for checking the plausibility of sensor data store the plausibility check results of previous calculation steps, and use this data in order to check the plausibility of the current sensor data. This can be used during processing steps, in which no independent results data and/or independent calculation results are available. The plausibility of the data of the modules for processing the sensor data can be easily checked with programmed expert knowledge by means of the history, since only changes within certain narrow limits can actually take place in a period of, for example, 60 msec between the processing steps, and which are used here for the plausibility check.

In a more advantageous embodiment, the reliability of the plausibility check results is weighted by the second module for monitoring the plausibility check of sensor data. This weighting can be carried out on the basis of empirical values, in particular expert knowledge, for each module for checking the plausibility of sensor data and thus advantageously illustrates the reliability of each module.

In addition, this invention provides a device for checking the plausibility of sensor data comprising at least one first module for processing sensor data, having a first input, a first output and a second output, at least one second module for checking the plausibility of sensor data, having a second input and a third output, a third module for monitoring the plausibility check of sensor data, having a third input and a fourth output, wherein the device is set up to input the sensor data which is received from at least one sensor into the first input of the first module for processing sensor data, and to output the processed sensor data at the first output of the first module for processing sensor data, to output data for checking the plausibility at the second output of the first module for processing sensor data and to input it into the second input of the second module for checking the plausibility of sensor data, to output plausibility check results at the third output of the second module for checking the plausibility of sensor data and to input them into the third input of the third module for monitoring the plausibility check of sensor data, and to output quality indicators for the sensors supplying the sensor data at the fourth output of the third module for monitoring the plausibility check of sensor data.

Further advantageous further developments and embodiments of the system according to the invention and the device according to the invention for checking the plausibility of sensor data result from other dependent claims and from the following description.

The above embodiments and further developments can, if expedient, be freely combined with one another. Further possible embodiments, further developments and implementations of the invention also include combinations of features of the invention, which are described above or below with regard to the embodiment examples, which are not explicitly indicated. In particular, the person skilled in the art will also add individual aspects as improvements or additions to the respective basic form of this invention.

BRIEF DESCRIPTION OF THE DRAWINGS

Other advantages, features and details of the invention result from the following description of embodiment examples and using the drawings, in which identical elements or elements with similar functions are provided with identical reference numerals, wherein.

DETAILED DESCRIPTION OF THE INVENTION INCLUDING PREFERRED EXAMPLE EMBODIMENTS

Figure 1:
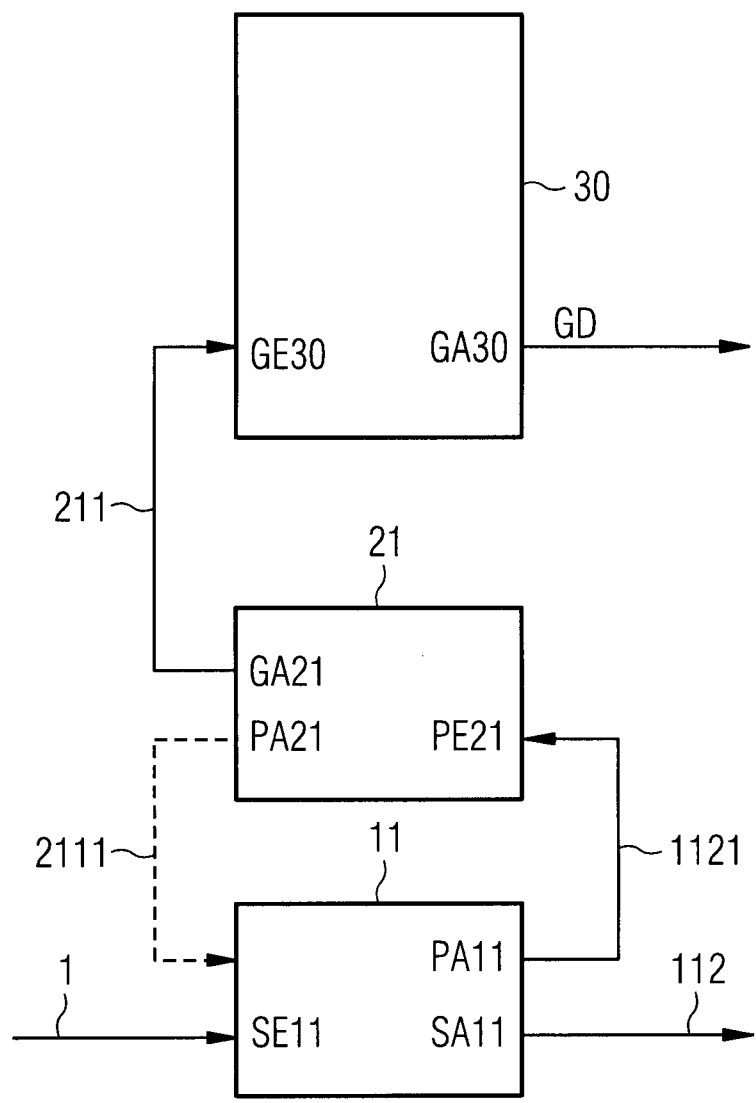
FIG. 1 shows a first embodiment of the method for checking the plausibility of sensor data in order to illustrate how it works.

FIG. 1 shows schematically a first embodiment of the method for checking the plausibility of sensor data in order to illustrate how it works. The first embodiment may form part of a lane detection system for vehicles.

The sensor data 1 generated and/or supplied by sensors is input into a first module 11 for processing sensor data in the latter's first input SE11. The first module 11 for processing sensor data is also referred to hereinafter as a processing module. The processing module 11 (and respectively each one of the modules disclosed herein) can be implemented in a general purpose computer processor executing a special algorithm as described herein, or in a special purpose computer processor configured and executing an algorithm as described herein, or in any suitable combination or circuit arrangement of electronic circuit components, computer processors, electronic memory devices, firmware and software to perform the method and carry out the features as disclosed herein.

The sensor data 1 is, for example, the raw data of a video camera installed in a vehicle. The sensor data 1 is also referred to hereinafter as camera data. The processing module 11 processes the sensor data 1 received, in that it detects, for example, road edge markings and lines, and determines a pitch angle of the vehicle from the lines and edges. A particular algorithm, which can carry out this data processing, is used for this. Depending on the quality of the camera data, this algorithm operates more or less reliably. In bad weather, for example, the camera data 1 may be of poor quality which, in turn, affects the edge detection of the algorithm. The edge detection, in turn, affects the determination of the vehicle's pitch angle which is then incorrectly calculated in conditions of poor visibility. The processing module 11 then outputs the result at a first output SA11 for further processing. The result is also output at a second output PA11 of the processing module 11, said output being connected to an input PE21 of a second module 21 for checking the plausibility of sensor data. This second module 21 for checking the plausibility of sensor data is also referred to hereinafter as a plausibility checking module 21.

The plausibility checking module 21 then checks the plausibility of the pitch angle output by the processing module 11 by using an alternative method for determining the pitch angle. In this embodiment, the plausibility checking module 21 determines the pitch angle by means of an optical flow. The result is compared with the pitch angle output by the processing module 11. The result of the comparison is output at an output GA21 of the plausibility checking module 21, and reaches an input GE30 of a third module 30 for monitoring the plausibility check of sensor data. The third module 30 for monitoring the plausibility check of the sensor data is also referred to hereinafter as a monitoring module 30. The monitoring module 30 knows the reliability of the plausibility checking module 21 and weights the result thereof accordingly. The monitoring module 30 then outputs quality data GD at an output GA30, said data making it possible to evaluate the current reliability of the system. An overriding system can use this quality data GD, for example, to disable the functionality of the lane assistant if the system is not sufficiently reliable, so that accidents can be avoided.

The steps described are continuously carried out periodically, for example every 60 ms, in the case of this first embodiment of the method. The overriding system therefore always receives up-to-date quality data GD regarding the reliability of the pitch angle.

In an alternative embodiment, the plausibility checking module 21 can also check the plausibility of the pitch angle calculated by the processing module 11 by means of the history of the previous processing steps. To this end, the pitch angles for the current processing step and a particular number of previous processing steps are stored in the plausibility checking module 21. The stored pitch angles are compared with the currently calculated pitch angle, and the change is determined e.g. by means of a calculated derivative. If the calculated change in the pitch angle is unrealistically high, the current value of the pitch angle is very probably wrong and the result of the processing module 11 is not plausible. The result 211 of the comparison is, in turn, input into the monitoring module 30 into input GE301, which weights it and outputs appropriate quality data GD and/or quality indicators.

Figure 2:
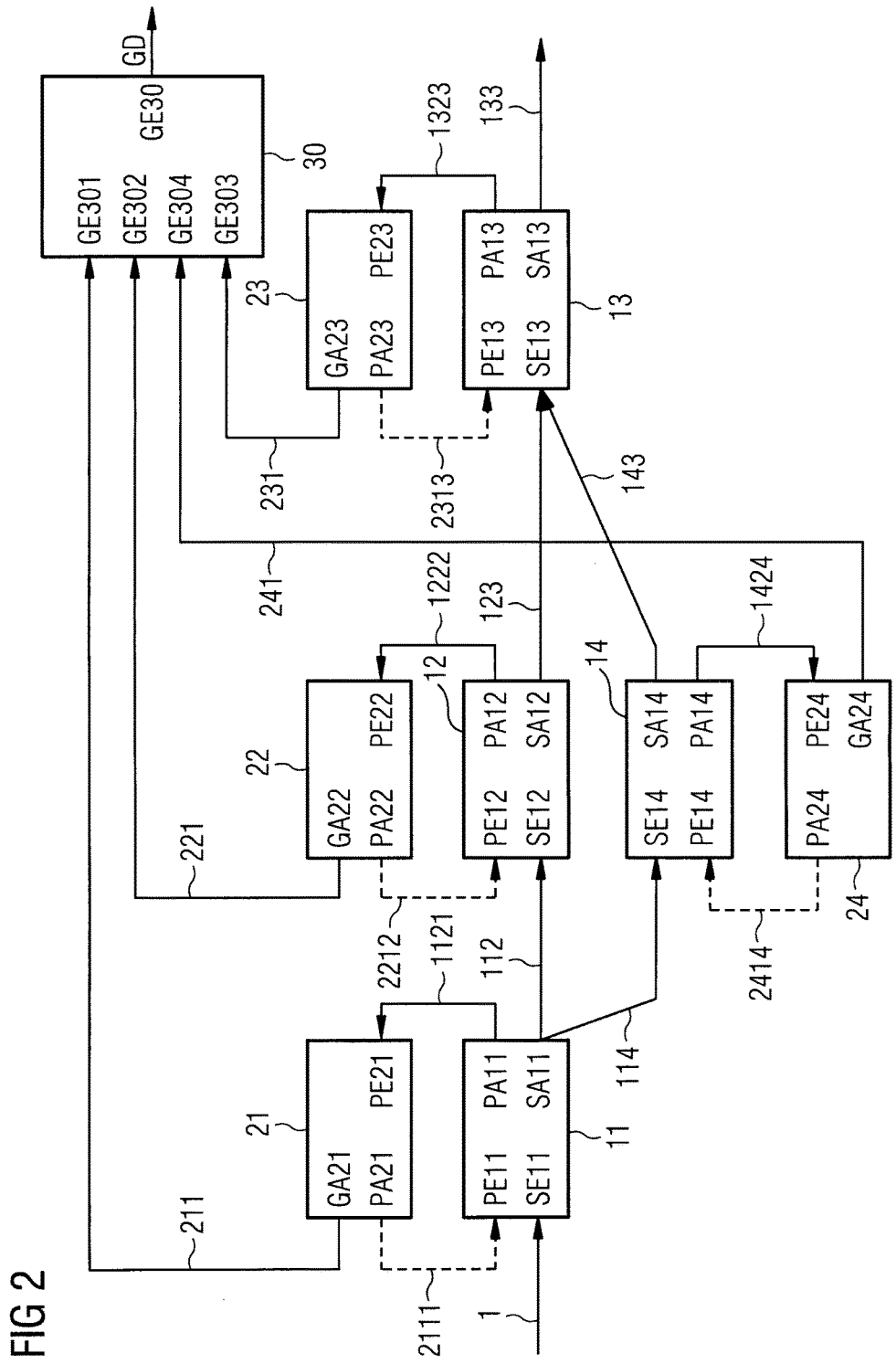
FIG. 2 shows a second embodiment of the method for checking the plausibility of sensor data in the application of a lane assistant.

FIG. 2 shows a second embodiment of the system for checking the plausibility of sensor data in the application of a lane assistant. The second embodiment is similar to the first embodiment, therefore the differences to the first embodiment shall be primarily described.

In the second embodiment, further calculations are carried out with the data from the camera in a plurality of processing modules.

Here again, the calculations are carried out periodically, for example every 60 ms, so that a continuous flow of information is provided. In the case of active lane detection, the sensor data recorded by the vehicle's sensors are evaluated, for example every 60 ms.

The raw camera data is verified and processed in a pre-processing module which is not shown here. The raw format from the camera is converted into a YUV format into a three-channel image, with luminance as one channel and chrominance in the remaining two channels. The plausibility of this image data is checked in an associated plausibility checking module and includes the formation of checksums and the verification of the pixel dynamics. The module then outputs the verified camera data 1 at its output.

The camera data 1 is input into an input SE11 of a first processing module 11. There, the camera data 1 is supplied to an algorithm which examines the image for the presence of edges. The algorithm is designed such that it is particularly good at detecting the contrasts of road markings on the road. However, other edges, e.g. of buildings, can also be detected. Vectors are generated on the basis of these edges, which are output at outputs SA11 and PA11. The result 1121 is input into the plausibility checking module 21 associated with the processing module 11. The plausibility checking module 21 stores a result of the previous processing steps, and also receives movement data from the respective vehicle, in particular its speed and the vehicle's pitch angle as calculated in the first embodiment. It can use this data to determine the plausibility of the result 1121 of the processing module 11. To do this, the stored data is transformed by means of the two vectors of speed and pitch angle and the result of this transformation is compared with the data 1121. The result 211 of this comparison is output at output GA21 of the plausibility checking module 21 and input into input GE301 of a monitoring module 30. The monitoring module 30 weights this result 211 based on programmed empirical values for the reliability.

The plausibility check by means of the history shall be briefly explained by means of a practical example: if the stored data in the plausibility checking module 21 indicates, for example, that the road ahead of the vehicle is 3.5 m wide and there is a long left-hand bend with a radius of 350 m ahead of the vehicle, then it is implausible if the processing module 11 indicates a road width of only 1.80 m and a sharp right-hand bend after a period of time of e.g. 60 ms later.

The plausibility checking module 21 can also feed feedback data 2111 back via output PA21 to input PE11 of the processing module 11. This is particularly useful in the case of a negative plausibility check result 211, since measures can be taken in the processing module 11, in order to improve the processing. For example, certain assumptions are made for the edge detection, on which the detection algorithm is based. Decisions are also made on the basis of calculated probabilities or predefined values, said decisions having an effect on the result. When the result is fed back, this can be incorporated into the processing and the assumptions made can be changed, for example, or the decisions and/or the values underlying the decisions can be changed, in order to improve the detection algorithm. Based on the feedback, this is run through again with modified values, and the plausibility check result is fed back to the processing module 11. Robust algorithms which automatically adjust to changing conditions can thus be provided with appropriate programming. The robustness of the algorithm can be increased by feeding back feedback data 2111 from the plausibility checking module 21.

The processing module 11 then passes on its result data 112, 114 to two processing modules 12, 14 which are connected in parallel, as shown in FIG. 2.

The processing module 12 receives this data at its input SE12, and further processes this data by calculating lines from the edge vectors. As a road marking always consists of a plurality of edges, this data is still not optimally suited to lane detection. The processing module 12 produces lines from these edges, which correspond to the road markings in terms of location and orientation. The plausibility of this result is checked again in the associated plausibility checking module 22, in that the processing result is input as plausibility checking data 1121 into input PE22 of the plausibility checking module 22. Here, too, the plausibility of the result is checked with an alternative verification model. This can also be based on historical, stored values from previous processing steps. However, the plausibility of the result can also be checked by means of a differently operating algorithm, which is run by the plausibility checking module 22, and the result of which is compared with the result of the processing module 12. The plausibility check result 221 is output at output GA22 of the plausibility checking module 22 and input into input GE302 of the monitoring module 30. It is also weighted there.

The other processing module 14 receives the data from the processing module 11 at its input SE14, and further processes it by detecting objects from the edge vectors. These objects can be e.g. fences, walls, pillars, columns or similar. The object detection evaluates the edges for specific patterns which are detected as objects. The objects are output at output SA14 of the processing module 14. The plausibility checking data 1424 is input into the associated plausibility checking module 24 in its input PE24. There, the plausibility of this data is also checked with an alternative verification model. As is already the case for the edge detection, this can be an algorithm based on the history and stored data of the last cycles, or a differently operating object detection algorithm, which also detects objects and performs the comparison of the results and which has already been described above. The plausibility check result 241 is provided at output GA24 of the plausibility checking module 24 and input into input GE304 of the monitoring module 30. The monitoring module 30 weights, in turn, this input with a predetermined indicator.

The processed sensor data 123 and 143 of the two processing modules 12, 14 are then input into input SE13 of the processing module 13. This module 13 assembles a virtual map of road markings and objects based on the data. This map will be further expanded in each cycle. It is clear from this map where the vehicle currently is on the road. The map is output at output SA13 to the overriding lane assistant for further processing. The map is also input at output PA13 to the plausibility checking module 23 into the latter's input PE23. The plausibility checking module 23, in turn, checks the plausibility of the map with a historically based algorithm, which also relates the data of the map objects to each other, in order to detect configurations which do not actually exist and, thus, errors.

For example, lane markings in the field of vision cannot intersect any road markings. Nor can lane markings of the vehicle's own driving lane be located behind elevated structures. The plausibility checking module 23 also establishes a lane model of the vehicle with its expected lane course. The vehicle's estimated lane course is then projected into the map, and the plausibility thereof is again checked on the basis of the existing objects in the map and the lane data. The plausibility of the estimated lane course can, in addition, be checked via the presence of parallel structures such as neighboring lanes in the map. The lane model is also correlated with the vehicle's own motion and it is checked whether the vehicle's trajectory is deviating from the detected lane. It is preferably also checked whether the lane model remains consistent over time.

In another embodiment, the map is not constructed in a two-dimensional form, but three-dimensionally. The advantage of this is that distortions in perspective are detected, and cannot result in errors. In addition, a possibly implausible result of the lane detection before crests and sinks can be properly construed and/or interpreted. The known problem of roads widening before motorway exits, which results in incorrect pitch angle calculations, can be remedied by means of three-dimensional modeling. Stereo cameras or a double methodology by means of edge detection and optical flow can be used for this.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims. The abstract of the disclosure does not define or limit the claimed invention, but rather merely abstracts certain features disclosed in the application.

REFERENCE NUMERALS

1 Sensor data
11, 12, 13, 14 Processing modules
21, 22, 23, 24 Plausibility checking modules
30 Monitoring module
SE11, SE12, Sensor inputs of the
SE13, SE14 processing modules
SA11, SA12, Sensor outputs of the
SA13, SA14 processing modules
PA11, PA12, Plausibility check outputs of the
PA13, PA14 processing modules
PE11, PE12, Plausibility check inputs of the
PE13, PE14 processing modules
PE21, PE22, Plausibility check inputs of the
PE23, PE24 plausibility checking modules
PA21, PA22, Plausibility check outputs of the
PA23, PA24 plausibility checking modules
GA21, GA22, Plausibility check result outputs
GA23, GA24 of the plausibility checking modules
GE301, GE302, Plausibility check result inputs GE303, GE304 of the monitoring module
GA30 Quality indicator output
112, 123, 133, 143 Processed sensor data
1121, 1222, Plausibility check
1323, 1424 data
2111, 2212, Plausibility check result
2313, 2414 feedback data
211, 221, 231, 241 Plausibility check results
GD Quality data

What is claimed is:

1. A system for checking the plausibility of sensor data, comprising:
   a sensor arrangement including at least one sensor of a vehicle configured to generate the sensor data,
   a first module configured and arranged to execute a processing algorithm to process the sensor data,
   a second module configured and arranged to check the plausibility of the processed sensor data, and
   a third module configured and arranged to monitor the plausibility check of the processed sensor data by calculating quality indicators for the at least one sensor that supplies the sensor data on the basis of results of the plausibility check,
   wherein:
   the first module has a first input, a first output and a second output,
   the second module has a second input and a third output,
   the third module has a third input and a fourth output, and
   the modules are respectively further configured so that:
   the sensor data is input into the first input of the first module, which processes the input sensor data by executing the processing algorithm, to produce processed sensor data that is output at the first output of the first module,
   second data for checking plausibility is output at the second output of the first module and input into the second input of the second module,
   the second module checks the plausibility of the sensor data by executing an alternative verification method, and accordingly produces the plausibility check results that are output at the third output of the second module and input into the third input of the third module, and
   the third module weights the plausibility check results and therefrom calculates the quality indicators, wherein the calculated quality indicators indicate a quality of the at least one sensor supplying the sensor data and are output at the fourth output of the third module.

2. The system according to claim 1,
   comprising a plurality of the first modules and a plurality of the second modules,
   wherein the first modules are connected in series to associated ones of the second modules, and
   wherein the processed sensor data of a preceding one of the first modules in series is input into the first input of a following one of the first modules in series.

3. The system according to claim 2,
   wherein all of the sensor data input into the first inputs of the first modules and all of the processed sensor data output at the first outputs of the first modules is checked for plausibility by the second modules by executing the alternative verification method, and
   wherein the plausibility check results that are output at the respective third outputs of the second modules are input into respective third inputs of the third module.

4. The system according to claim 1, wherein the second data for checking the plausibility is identical to the processed sensor data.

5. The system according to claim 1,
   wherein the first module has a further input, and
   wherein the plausibility check results from the second module are input as plausibility check result feedback data into the further input of the first module.

6. The system according to claim 1, wherein the alternative verification method includes the use of a second source of information to check the plausibility of the sensor data.

7. The system according to claim 1,
   wherein the second module stores the plausibility check results of previous plausibility checks, and
   wherein the second module uses the previous plausibility check results for checking the plausibility of the current sensor data.

8. A device for checking the plausibility of sensor data, comprising:
   a sensor arrangement including at least one sensor of a vehicle configured to generate the sensor data,
   a first module for processing the sensor data, having a first input, a first output and a second output,
   a second module for checking the plausibility of the processed sensor data, having a second input and a third output,
   a third module for monitoring the plausibility check of the processed sensor data, having a third input and a fourth output,
   wherein the device is configured and adapted:
   to input the sensor data, which is received from the at least one sensor, into the first input of the first module, and to output the processed sensor data at the first output of the first module,
   to output plausibility checking data at the second output of the first module, and to input the plausibility checking data into the second input of the second module,
   to output plausibility check results at the third output of the second module, and to input the plausibility check results into the third input of the third module, and
   to out put quality indicators calculated by the third module for the at least one sensor at the fourth output of the third module.

9. A method of operating the system according to claim 1 for checking the plausibility of the sensor data, comprising the steps:
   generating the sensor data with the at least one sensor of the vehicle,
   inputting the sensor data into the first input of the first module,
   with the first module processing the sensor data by executing the processing algorithm to produce the processed sensor data and to produce the second data for checking plausibility,
   outputting the processed sensor data at the first output of the first module,
   outputting the second data for checking plausibility at the second output of the first module,
   inputting the second data for checking plausibility into the second input of the second module,
   with the second module checking the plausibility of the sensor data by executing the alternative verification method, to produce and output the plausibility check results at the third output of the second module,
   inputting the plausibility check results into the third input of the third module,
   with the third module weighting the plausibility check results and therefrom calculating the quality indicators that indicate the quality of the at least one sensor on the basis of the plausibility check results, and outputting the quality indicators at the fourth output of the third module.

10. The method according to claim 9, further comprising evaluating the quality indicators, and disabling functionality of a lane assistant system of the vehicle when the quality indicators indicate that the quality of the at least one sensor supplying the sensor data is not sufficiently reliable.

11. A method of checking the plausibility of sensor data, comprising the steps:
generating the sensor data with at least one sensor of a vehicle,
processing the sensor data by executing a predefined processing algorithm on the sensor data to produce processed sensor data,
periodically checking the plausibility of the processed sensor data by periodically performing an alternative verification method different from the predefined processing algorithm,
calculating quality indicators for the at least one sensor that generates the sensor data on the basis of results of the periodic checking of the plausibility,
evaluating the quality indicators, and
disabling functionality of a driver assistance system of the vehicle when the quality indicators indicate that the quality of the at least one sensor supplying the sensor data is not sufficiently reliable.

12. The method according to claim 11, wherein said step of checking the plausibility of the processed sensor data is carried out every 60 ms.

13. The method according to claim 11, wherein the driver assistance system is a lane assistant system of the vehicle.

14. A method of checking a plausibility of sensor data, comprising the steps:
generating sensor data with at least one camera sensor of a vehicle,
processing said sensor data by executing a predefined processing algorithm on said sensor data to produce processed sensor data, wherein said predefined processing algorithm comprises an edge detection algorithm,
performing a plausibility check by executing an alternative algorithm on plausibility checking data based on said sensor data, wherein said alternative algorithm is different from said predefined processing algorithm and comprises an optical flow algorithm,
comparing said processed sensor data with a result of said plausibility check to produce a plausibility result that indicates a plausibility of said processed sensor data, and
based on said plausibility result, calculating a quality indicator that indicates a quality of said at least one camera sensor that generated said sensor data.

15. The method according to claim 14, wherein said processed sensor data is used as said plausibility checking data.

16. The method according to claim 14, wherein said sensor data is used as said plausibility checking data.

17. The method according to claim 14,
wherein said at least one camera sensor consists of one single camera sensor of said vehicle, and
wherein said sensor data is generated by only said one single camera sensor.

18. A method comprising the steps:
generating camera data with a camera sensor of a vehicle,
executing an edge detection algorithm on said camera data to produce a first result,
executing an optical flow algorithm on said camera data to produce a second result,
performing a plausibility check by comparing said first result with said second result to produce a plausibility check result, and
controlling a driver assistance system based on said first result dependent on said plausibility check result.

19. A system for checking a plausibility of sensor data, comprising:
a sensor arrangement including at least one camera sensor of a vehicle configured to produce sensor data,
a processing module configured to execute a processing algorithm to process the sensor data and produce processed sensor data and plausibility checking data, wherein the processing algorithm comprises an edge detection algorithm,
a plausibility checking module that is configured to execute an alternative algorithm on the plausibility checking data, wherein the alternative algorithm is different from the processing algorithm and comprises an optical flow algorithm, and wherein the plausibility checking module is further configured to compare the processed sensor data with a result of the alternative algorithm executed on the plausibility checking data, and based thereon to produce a plausibility check result, and
a monitoring module configured to calculate, based on the plausibility check result, a quality indicator that indicates a quality of the at least one camera sensor that produced the sensor data.

20. The system according to claim 19,
wherein the at least one camera sensor consists of one single camera sensor of the vehicle, and
wherein the sensor arrangement includes only the one single camera sensor.

21. The method according to claim 14, further comprising a step of controlling a driver assistance system of the vehicle based on said processed sensor data dependent on said quality indicator.

* * * * *